(12) United States Patent
Doll

(10) Patent No.: US 8,668,239 B2
(45) Date of Patent: Mar. 11, 2014

(54) STORAGE COMPARTMENT DEVICE

(75) Inventor: Volker Doll, Ranschbach (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 13/591,971

(22) Filed: Aug. 22, 2012

(65) Prior Publication Data

US 2013/0212949 A1  Aug. 22, 2013

(30) Foreign Application Priority Data

Aug. 22, 2011  (DE) .......................... 10 2011 111 269

(51) Int. Cl.
*B60R 13/01* (2006.01)
(52) U.S. Cl.
USPC ..................................... 296/37.12; 312/334.7
(58) Field of Classification Search
USPC ................. 296/37.9, 37.12; 312/334.1, 334.7
See application file for complete search history.

(56) References Cited

U.S. PATENT DOCUMENTS

| 3,295,903 | A | * | 1/1967 | Middleton .................... 312/246 |
| 6,213,533 | B1 | | 4/2001 | Widulle et al. |
| 6,783,166 | B2 | * | 8/2004 | Kato .......................... 296/37.12 |
| 2004/0140685 | A1 | | 7/2004 | Bieck et al. |
| 2006/0131913 | A1 | | 6/2006 | Herterich et al. |

FOREIGN PATENT DOCUMENTS

| DE | 19835364 | 2/2000 |
| EP | 1431123 | 6/2004 |

* cited by examiner

*Primary Examiner* — Joseph Pape
(74) *Attorney, Agent, or Firm* — Reising Ethington P.C.

(57) ABSTRACT

A storage compartment device for an interior panel part of a vehicle and having a housing with at least one access opening, through which a drawer is at least partially movable. The drawer has side walls and a base that is able to be moved between a retracted position and an extended position through the access opening of the housing. A guiding device is provided for moving the drawer between the retracted position and the extended position, which is constructed for guiding the drawer on moving between the retracted position and the extended position along a continuous curved path of movement.

19 Claims, 11 Drawing Sheets

STORAGE COMPARTMENT DEVICE

TECHNICAL FIELD

The present invention relates a storage compartment device, which can be used in particular for the interior fittings for the interior of a vehicle.

BACKGROUND OF THE INVENTION

From the document US 2006/131913 A1 such a storage compartment, also designated a glove compartment, is known, which can be moved as a drawer along a track from a retracted position into an extended position.

From the documents US 2006/131913 A1 and EP 1 431 123 A1, flap mechanisms are known for a storage compartment with a flap, which are movable about a rotation bearing such that an opening for access and/or viewing into the storage compartment device can be opened and closed.

SUMMARY OF THE INVENTION

It is an object of the present invention to provide a storage compartment device in which accessibility of the storage compartment device is conFigured in a more user-friendly manner.

A further object is to provide a storage compartment device with a drawer which makes possible a special adaption of the movement of the drawer to the design of the inner lining part and the interior of the vehicle under ergonomic requirements.

In accordance with an aspect of the invention, a storage compartment device, in particular for the interior of a vehicle, is provided, the storage compartment device comprising a housing with at least one access opening, a drawer, a guiding device, by which the drawer is connected to the frame such that it is movable between a retracted position and an extended position through the access opening. The guiding device comprises at least one guide track and contact devices, one of which is mounted on the frame and the other of which is mounted to the drawer. The guide track comprises at least a section in which the guide track has a curved form so that the gravity force acting on the drawer in an intermediate state between the retracted and extended state supports the movement of the drawer in a further retracted state and/or supports the movement of the drawer in a further extended state.

In one or more embodiments of the storage compartment device, the guide track comprises a middle section and two end sections extending in opposed directions from the middle section, wherein the two end section have a curved form by which the guide track increasingly descend with regard to the middle section.

In one or more embodiments of the storage compartment device, the guide track comprises two end sections which have a curvature the directions thereof being opposed to each other, so that the guide track has a inflection point.

In one or more embodiments of the storage compartment device, each of the contact devices is realized as a pair of rollers, wherein first roller is in contact here with the first contact surface of the guide track and a second roller is in contact with the second contact surface of the guide track lying opposed to the first contact surface.

In one or more embodiments of the storage compartment device, the storage compartment device comprises two guide tracks positioned on opposed sides of the drawer and wherein the rollers are synchronized by a synchronization device. Alternatively, the guide track comprises at least one convexity for receiving a roller on the first surface.

In one or more embodiments of the storage compartment device, the drawer comprises a base plate which is curved between a first end and a second end of the drawer with a uniform curvature therebetween, wherein the curvature is formed such that with regard to a longitudinal direction of the storage compartment device a middle section of the base plate lies above with regard to the direction of the gravity force than the end section of the base plate.

In one or more embodiments of the storage compartment device, the drawer has a front wall, which is fixedly connected with the drawer.

A storage compartment device according to an embodiment of the invention, in particular a storage compartment device for an interior panel part of a motor vehicle, has a housing which does not necessarily have to be completely closed, but rather can also be constructed as a partially open frame. The housing is not necessarily visible for the occupant of a vehicle who wishes to use such a storage compartment device. In particular, the storage compartment device therefore forms, through the housing, a static part with respect to the displaceability of the drawer, which can serve for connection in the interior of a vehicle, i.e. for the fastening of the storage compartment device in a vehicle or respectively on an interior panel part of a vehicle. The housing has at least one access opening. A drawer is able to be moved at least partially through this access opening. The access opening is therefore also to be designated as a movement opening for the drawer in the housing. The drawer has side walls and a base, which together with a back wall and front wall of the drawer define the storage volume of the drawer. Advantageously, the drawer is open at the top, so that an access and/or a view can take place in the extended state from above into the storage volume of the drawer.

The drawer is movable between a retracted and an extended position. Sections of the side walls and of the base are moved here through the access opening, whilst this is not the case for the back wall and front wall. The retracted position of the drawer is distinguished in that a view and/or an access into the storage volume of the drawer is essentially not possible. In the extended position, on the other hand, such an intervention into the storage volume of the drawer is possible.

A guiding device is provided for guiding the drawer. This guiding device serves for the moving of the drawer between the retracted and the extended position along a continuously curved path of movement. On movement from the retracted position into the extended position or vice versa, the drawer is deflected by the guiding device from a substantially translatory withdrawal direction in the direction of a first optical axis in the direction of a second optical axis. Such optical axes are also designated as imaginary straight lines. Therefore, the resulting movement of the drawer can be understood as a superimposition of two translatory movements along two optical axes standing at right angles to one another. Hereby, the drawer can assume a position in the extended position, in which the accessibility is distinctly increased. At the same time, therefore, the freedom of configuration in the choice of the retracted position is increased, so that the optimized utilization of installation space can be achieved with an optimized ratio of required installation space for the storage compartment device to storage space of the drawer.

A "continuously curved path of movement" is to be understood to mean that the curvature of the path of movement can basically vary, but no jumps in the curvature, in particular no steps, are present. In this way, through the continuous, in particular the constantly varying curvature course of the path of movement, a correspondingly smooth movement course of the drawer can be ensured between the retracted and the extended position. A smooth movement sequence is to be understood to mean a substantially non jerky movement of the drawer, in particular a movement free of jumps. A smooth guidance of movement by the guiding device is advantageous, because occupants of a vehicle equate such a movement with a high quality of the storage compartment device itself.

The housing can be constructed so that it also serves partly for the bearing of the drawer. The housing cooperates here with the guiding device, or the guiding device is associated with the housing. Such a housing does not necessarily have to be completely closed, but rather can also form the necessary function for the bearing of the drawer in the form of a partially open frame, in particular with the aid of the guiding device. In particular, the housing can be constructed in one piece with the guiding device and/or can be constructed from uniform material, e.g. as a plastic component.

In order to achieve a particularly user-friendly accessibility of the storage compartment device, provision is preferably made that the path of movement between the retracted position and the extended position has a degree of curvature of 10° to 30°. Therefore, owing to the minimal curvature of 10° in the extended position the drawer is inclined with a corresponding oblique base towards an occupant, so that the storage space of the drawer can be easily seen and objects in the drawer are able to be reached comfortably. Through the limitation of the degree of curvature to a maximum of 30°, it is ensured that objects can not surmount the front wall or one of the side walls of the drawer through vibrations due to travel, i.e. cannot "jump out" from the storage space of the drawer.

In addition, provision is preferably made that the path of movement between the retracted position and the extended position has a turning point which divides the path of movement into a first section with a positive degree of curvature and a second section with a negative degree of curvature. Thus, independently of the extended position, an enlarged region is available for the position of the drawer in the retracted position. This permits the installation space requirement to be minimized by optimizing the retracted position, and thus allows the ratio of storage space of the drawer to installation space requirement to be optimized. In the installation position, for example, the first section with the positive degree of curvature in the direction from the retracted to the extended position constitutes at least partially an ascending slope, whilst the second section in this direction acts at least partially as a descending slope.

The radii of the sections can be constant, i.e. the curvature is constant. In addition, the radii of the two sections can be identical or different. Preferably, provision is made that the first section of the path of movement has a first radius which lies within a first range of values, and the second section of the path of movement has a second radius, which lies within a second range of values, wherein the first range of values and the second range of values are selected to be partially not overlapping one another. Therefore, the radii can alter along the path of movement within the range of values, so that with a small installation space requirement a substantially jerk-free movement of the drawer, in particular a jump-free movement, becomes possible. In so doing, the installation space requirement becomes particularly small, when the two ranges of values overlap one another in a first partial region, but do not overlap in a second partial region, because thus the play for the choice of position of the retracted and of the extended position is particularly great.

The first section of the path of movement can be equally long as the second section of the path of movement. Preferably, provision is made that the first section of the path of movement in the withdrawal direction of the drawer is longer than the second section of the path of movement. Thus, an occupant is given a particular haptic sensation with changing of direction on actuating the storage compartment device.

The amounts of the degrees of curvature of the first section and of the second section can likewise be of equal size. Preferably, provision is made that the amount of the degree of curvature of the first section of the path of movement is greater than the amount of the degree of curvature of the second section of the path of movement. Also hereby an occupant is given a particular haptic sensation on actuating the storage compartment device, or this sensation is further intensified.

In order to further increase the accessibility, the front wall of the drawer can be constructed so as to be swivellable. Preferably, provision is made that the drawer has a front wall which is connected fixedly with the drawer. Thus, with a simple construction with a front wall securely connected to the drawer, the accessibility can be distinctly increased.

The moving of the drawer between the retracted position and the extended position can take place manually by an occupant. In order to facilitate the moving of the drawer between the retracted position and the extended position, a drive can be provided, which brings about the movement completely, or only assists this. In so doing, the drive can act in both directions, i.e. a moving from the retracted into the extended position and from the extended into the retracted position is brought about or assisted. For this, the drive can have, for example, an electric motor. In addition, the drive can act or assist only in one direction. In this case, the drive can have for example an energy store, such as e.g. a spring, which stores energy when for example the drawer is moved from the extended into the retracted position which then is delivered on a moving of the drawer from the retracted into the extended position, in order to bring about or assist this movement. Preferably, provision is made that the drawer, installed into a vehicle, is moved by the effect of gravity into the retracted position and/or the extended position. The circumstance is therefore utilized that owing to the curved path of movement the latter has sections acting as a descending slope, which bring about or assist a movement of the drawer. When the effect of gravity is to bring about the movement alone, the descending slope is selected to be so intense that the effect of gravity is greater than the breakaway torque of the guiding device. If, on the other hand, the effect of gravity is to only assist the movement, the descending slope is selected so that the effect of gravity is less than the breakaway torque of the guiding device. It is thus ensured that an undesired movement of the drawer solely by the effect of gravity is ruled out, but rather the drawer remains in the desired position.

The guiding device can be conFigured in different ways for guiding the drawer. According to a first, preferred embodiment, the guiding device has a continuously curved guide track device. In such a guiding device, this can be, in the simplest manner, a track system wherein the drawer is suspended in such a track, i.e. is mounted, and is able to be moved in this track. The guide track device is fixed here in particular with respect to the housing of the storage compartment device. Guide means, which are associated with the drawer, cooperate with the guide track device. Therefore, by the moving of the drawer, a relative movement is produced between guide means and guide track device.

Stops or guide blocks can be used, for example, as guide means, which are produced together with the guide track device from an adhesion-reducing material pair. Preferably, the guide track device cooperates with rollers which are associated with the drawer. Hereby, the friction between guide means and guide track device is reduced to a minimum. Thereby, the necessary expenditure of energy, the wear arising through the expenditure of energy and the noise emission occurring through the movement of the rollers along the guide track device is reduced to the desired extent, whereby the quality perception of a storage compartment device is improved.

In order to further increase the quality perception and to avoid an undesired tilting of the rollers on the guide track device, provision is preferably made that the guide track device is arranged between a roller pair of rollers, which are in contact with different contact surfaces of the guide track device. When installed, the guide track device has an upper and a lower contact surface, wherein one of the two rollers of the roller pair is in contact with the upper contact surface, whereas the second roller of the roller pair is in contact with the lower contact surface. Hereby, the play of the guide track device and the rollers serving as guide means is reduced, and thus the quality perception is improved.

A further increase in the quality perception is achieved in that preferably two roller pairs are arranged spaced apart from one another by a minimum distance in the withdrawal direction of the drawer, because in this way the play between the guide track device and the rollers serving as guide means is further reduced.

According to a second, preferred embodiment, the guiding device has a linkage. With such a linkage, the drawer can be guided along a desired, continuously curved path of movement.

Preferably, the linkage is constructed as a four-bar chain. Such a four-bar chain has four pivot joints, two of which are securely connected with the housing. With each of these two pivot joints, in each case a transmission member is connected, which in turn are connected with the remaining pivot joints. These two pivot joints are connected with one another via a coupler. Therefore, such a transmission has only one degree of freedom. The four-bar chain can be constructed as a double rocker when the path of movement has no turning point. If, however, the path of movement is to have a turning point, the four-bar chain can be constructed as a crank-rocker mechanism.

Preferably, a drawer cover is provided for covering the storage volume of the drawer. This drawer cover is pivotably or respectively rotatably mounted on the drawer by means of a bearing device such that it is in a covering position in the retracted position of the drawer. In this covering position, it at least partially covers the drawer. In an extended position of the drawer, the drawer cover is in an exposing position, in which it at least partially exposes the drawer. In other words, in addition to the manoeuvrability of the drawer, a manoeuvrability of the drawer cover is also provided.

These two maneuverabilities correlate with one another in that through the moving of the drawer into the extended position, the drawer cover moves into the exposing position, and vice versa. For this correlation, a guide device is provided which is coupled with the guiding device and which serves for the movement of the drawer cover between the covering position and the exposing position. The guide device can therefore also be understood as a coupling between the movement of the drawer and the movement of the drawer cover.

Such guide devices can be conFigured in the most varied of ways. They may be purely mechanical in nature, or may also have electro-mechanical or other drive mechanisms. A preferred embodiment of the guide device is a mechanical construction, because this can be constructed with very few and particularly simple and favourably priced components, and does not require any additional connections, whereby the complexity of the guide device is reduced.

The terms "exposing position" and "covering position" of the drawer cover are to be understood as follows. In the covering position, the drawer cover is situated in a position in which it covers at least a portion of the drawer, so that a view and/or access into the storage volume of the drawer through the covered part is not possible. It is to be pointed out here that the covering does not have to take place completely, but rather that by the retracting of the drawer into the housing into the retracted position, already by the housing itself or by further elements of an interior panel part of a vehicle, a majority of the possibilities for access and viewing into the storage volume of the drawer are covered. The drawer cover must necessarily only cover the remaining opening, in particular a region which corresponds substantially to the access opening of the housing. Covering here of course means a technically expedient covering and not a complete covering, so that clearances which are necessary for manufacture can remain with the covering.

The exposing position is to be understood as a position of the drawer cover into which it has carried out a pivoting movement out from the covering position. In the exposing position, the drawer cover is therefore situated in a position in which it exposes at least a portion of the access to the storage volume of the drawer. The exposure is to be understood here to mean the view and/or access into the storage volume of the drawer.

On drawing the drawer out into the extended position, thereby the view and/or access into the storage volume of the drawer is enabled in two ways. Firstly, by the drawing out of the drawer, the covering of a majority of the storage volume by further interior panel parts and/or by the housing of the storage compartment device is overridden, so that a view and an access become possible. Moreover, the drawer cover moves into its exposing position, so that also the region of the drawer which was previously covered by the drawer cover, is now at least partially exposed. In other words, the possibility of viewing and access into the storage volume of the drawer is added to a sum of the exposure by the exposing position of the drawer cover and the exposure by the moving of the drawer into the extended position. In this way, an improved possibility for access and viewing into the drawer of the storage compartment device is provided. With the same withdrawal, compared with a simple drawer, by folding down the drawer cover into the exposing position, an increased possibility for intervention and viewing can be provided.

In a storage compartment device constructed as described herein, it can be advantageous if the guide device guides the drawer cover, on moving the drawer into the retracted position, in its covering position. The guide device therefore has a part of a correlation, so that a movement coupling exists between the movement of the drawer and the movement of the drawer cover. Depending on the embodiment of the guide device, this can be solved in different ways. In the illustrated embodiments, the guide device introduces an active intervention into the movement of the drawer cover. The drawer cover is therefore guided actively into the covering position, and this guidance takes place as a function of the movement of the drawer into the retracted position. The handling of a storage compartment device is simplified by the guide device. A user, i.e. the occupant of a vehicle, only has to move the storage compartment device, in particular the drawer, into the retracted position. The drawer cover follows, guided by the guide device, automatically and moves into the covering position, so that by the movement of the drawer into the retracted position, the storage compartment device can be completely closed.

It can likewise be advantageous if the guide device guides the drawer cover, on moving of the drawer into the extended position, in its exposing position. This concerns, as it were, the reverse direction of movement with regard to the coupling, as has been explained in the preceding paragraph. Here, also, the drawer cover is actively guided and the occupant of a vehicle, owing to the automatic coupling through the guide device between drawer cover and drawer itself, only has to initiate or carry out the movement of the drawer. This also further improves and simplifies the handling of the storage compartment device.

Preferably on and/or in the guide track device at least one guide means is guided, which is associated with the drawer cover, e.g. is arranged on the drawer cover. The guide itself can be conFigured here in various ways and is adapted in particular to the type of guide means. The guide track device here is in particular stationary with respect to the housing of the storage compartment device, whilst the guide means is stationary with respect to the drawer cover. A relative movement between the drawer cover and the housing therefore results in a relative movement between the guide means and the guide track device. In other words, by the movement of the drawer, or respectively therefore also the movement of the drawer cover, a relative movement is produced between guide means and guide track device.

This relative movement can be utilized in order to initiate the desired movement of the drawer cover between the covering position and the exposing position through the direction setting of the guide track device or respectively the configuration of the guide means. The guide track device can be both a one-sided stop here, on which the guide means can move along the guide track device. It is also conceivable that the guide track device concerns a complete guidance of the guide means, so that the guide means is totally restricted with regard to its freedom of movement by the guide track device to the desired line of movement.

The guide track device itself is advantageously limited here to the necessary range of the guidance, in order to guarantee the movement of the drawer cover between the covering position and the exposing position. At the two end points of the guide track device, at which the guide means is situated, when the drawer cover is in the exposing position, or respectively in the covering position, advantageously a stop is provided, so that a further movement of the guide means is not possible. Thereby also the end positions of the guide means and hence the end positions of the drawer cover, i.e. the exposing position and the covering position, are exactly defined.

It is likewise advantageous if the guide means is constructed as a rotatable roller. Basically, a rotatably mounted guide means is advantageous, because in this way the friction between guide means and guide track device is reduced to a minimum. Thereby, the necessary expenditure of force, the wear resulting through the expenditure of force, and the noise emission occurring through the movement of the guide means along the guide track device is reduced to the desired extent, whereby the quality perception of the storage compartment device is improved.

It is advantageous if the guide device has a support of the drawer cover against the drawer. This support prevents a pivoting movement of the drawer cover about other axes than a pivot axis defined by the bearing device. In order to achieve this, it can be advantageous if the guide device has for example more than one, in particular two guide track devices, which are provided at positions of the housing which permit such support. Frequently in the configuration of a storage compartment device described herein, the use of two guide track devices will be advantageous, which in relation to the access opening of the housing are arranged to the left and right of the latter, so that the drawer can move through the access opening between the guide track devices. Thereby, as wide a supporting as possible occurs for the drawer cover against the guide track devices and hence against the housing, so that the lever arm for the supporting and hence the possible force transmissions are maximized. Through the supporting of the cover, the quality of the guidance and hence the quality of the movement course of the drawer cover between the exposing position and the covering position is still further improved.

It can be further advantageous if the bearing device, in relation to the installation position of the storage compartment device in a vehicle, is arranged in the lower third of the drawer cover. In this way, a lever ratio is achieved, in which the majority, in particular more than two thirds of the drawer cover, is the relevant section of the drawer cover which is responsible for the covering, or respectively the exposure to the storage volume of the drawer. The maximizing of this section by this arrangement of the bearing device has the advantage that with the same dimensioning of the drawer cover, the additional exposure length, or respectively the additional exposure area, can be increased. As the possibility of the entire access into the storage volume of the drawer is composed as a sum of the exposed section in the exposure position of the drawer cover and the exposed section by the extending of the drawer into the extended position, the entire access possibility can be improved by the arranging of the bearing device in the lower third of the drawer cover.

It is likewise advantageous if the drawer cover has side wall elements. These are aligned along the adjoining side wall of the drawer and preferably at least partially overlapping therewith in the covering position. By this overlapping, a further advantage can be achieved during the extending into the extended position and the moving, occurring simultaneously therewith, of the drawer cover into the exposing position. The overlapping decreases by the moving of the drawer cover into the exposing position, so that the side wall elements of the drawer cover as it were are extended and further cover the gap otherwise occurring between the drawer cover and the respective side wall of the drawer. Advantageously, the overlapping between the side walls of the drawer and the side wall elements of the drawer cover is so great that it is sufficient to almost completely cover the gap occurring in the exposing position of the drawer cover between the latter and the side walls of the drawer. In this way, the advantage can be achieved that on the one hand the gap having a visually disadvantageous effect is covered, and moreover a falling out of objects, or respectively a jamming in this gap, which would make difficult or prevent a moving of the drawer cover back into the covering position, is avoided.

In addition it is advantageous if the side wall elements are formed at least partially from an elastic material. In such an embodiment, the side wall elements of the drawer cover can be connected with the side walls of the drawer, so that during the movement of the drawer cover into the exposing position, the elastic material is expanded, and on moving of the drawer cover back into the covering position, the elastic material forms back again. Through the elastic configuration and the thus possible fastening of the side wall elements of the drawer cover on the side walls of the drawer, an overlapping of the side wall elements and of the side walls becomes no longer necessary, and nevertheless the resulting gap is almost completely prevented.

In addition it is advantageous if the bearing device of the drawer cover is arranged such that its rotation axis is spaced apart from the centre of gravity of the drawer cover in one direction, so that the weight force of the drawer cover generates a torque about this pivot—or respectively rotation axis, which works towards the movement of the drawer cover into the exposing position. In other words, the centre of gravity of the drawer cover is situated in relation to the pivot axis of the drawer cover such that it would move the drawer cover into the exposing position without application of force by other means. Therefore advantageously the guide device is arranged relative to the drawer cover such that it supports the torque which is generated by the weight force of the drawer cover, and holds the drawer cover in its covering position, in particular when the drawer is situated in the retracted position.

Through the embodiment described above, the advantage is achieved that no active guiding device has to intervene into the movement of the drawer cover. Rather, the guide device is also able to be constructed purely passively, because the necessary force for opening the drawer cover can be provided by its own weight force. In this way, the overall system of the storage compartment device can be reduced as regards its complexity. The guide track device is able to be conFigured more simply here, because it only has to provide the supporting and the returning of the drawer cover into the covering position, i.e. the overcoming of the weight force of the drawer cover. Of course, the guide device can also be constructed distinctly more simply here, in particular in the form of a simple stop, which on moving of the drawer into the retracted position presses the drawer cover into the covering position. More elegant, however, with regard to the movement course of the drawer cover is the use of a guide track device, in particular in correlation with a guide means, which is arranged on the drawer cover.

It is a further advantage if the guide device presses and/or draws the drawer cover into the covering position. In other words, a force is applied through the guide device onto the drawer cover, which presses it into the covering position. One can therefore speak in terms of a prestressing of the drawer cover, which presses and/or draws the drawer cover into the covering position. This has the advantage that the drawer cover, at the corresponding housing regions and/or the regions of an interior panel part, in which it lies in the covering position, is pressed against these corresponding elements. Through the prestressing force, therefore, the stability of the covering position is further improved and in particular an unpleasant rattling through a relative movement of the drawer cover to these elements is prevented. Moreover, through the prestressing force, the complexity of the storage compartment device can be further simplified, because a locking device of the storage compartment device can be dispensed with. Whereas known glove compartments require locks, which prevent a flapping out of the drawer cover, through the provision of the prestressing force in connection with the guide device, such a necessity of a locking device can be avoided.

It is also advantageous if the guiding device has a combination of at least one toothed wheel and at least one toothed rack, which are arranged on the drawer and on the housing, or vice versa. The toothed wheel and the toothed rack mesh into one another, so that through this form of the gearing a drive of the storage compartment device, in particular a drive of the movement of the drawer between the refracted position and the extended position is possible. The drive of the toothed wheel can take place here electromotively, for example.

It is also advantageous if the guiding device has at least one grip element, which is associated with the drawer, e.g. is arranged on the drawer and is able to be used without impairment to the movement of the drawer cover between the covering position and the exposing position for the moving of the drawer. The grip element serves for operating the drawer of the storage compartment device, for example by an occupant. By the separate construction of the grip element on the drawer, the movement of the drawer cover is not impaired, so that by the activated movement of the drawer automatically also the movement of the drawer cover is induced. For example, a recess can be provided in the drawer cover, through which the occupant of a vehicle can reach the grip element, for example a recessed grip on the drawer.

BRIEF DESCRIPTION OF THE DRAWINGS

One or more embodiments of the present invention are explained in further detail with the aid of the enclosed Figures of the drawings. The terms "left", "right", "above", and "below" which are used here refer to an alignment of the Figures of the drawings with normally readable reference numbers. In the Figures.

DESCRIPTION OF THE ILLUSTRATED EMBODIMENTS

Figures 1A, 1B:
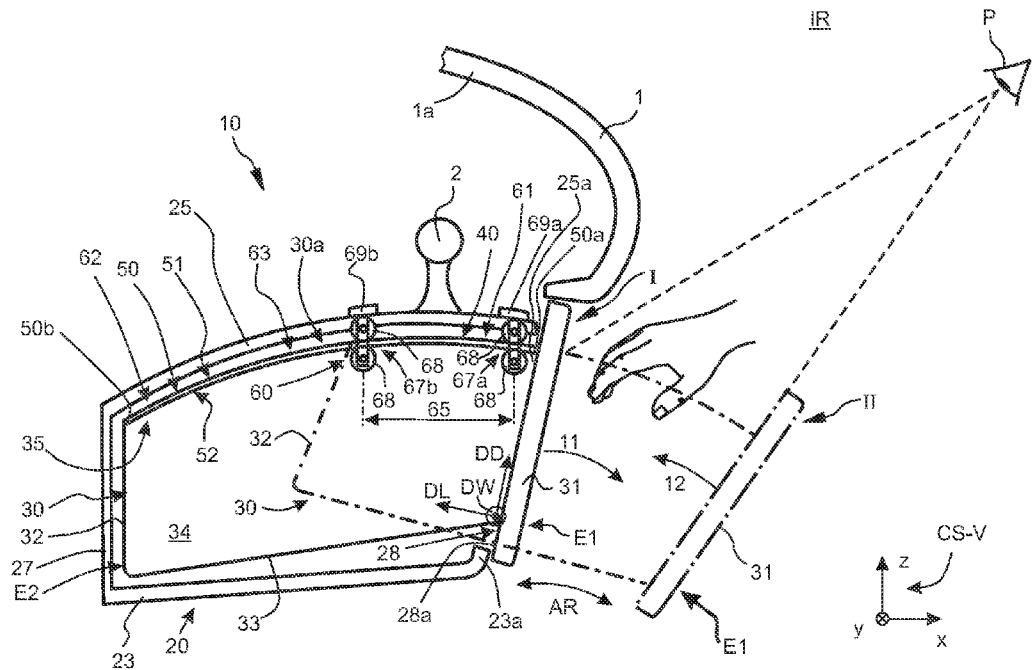
FIG. 1a shows a first embodiment of a storage compartment device according to the invention in a schematic cross-sectional view, wherein a guide track device of the storage compartment device has a uniform direction of curvature and wherein in FIG. 1a the drawer is illustrated in the retracted position and in dashed lines in the extended position.
FIG. 1b shows the embodiment of a storage compartment device shown in FIG. 1a in the same presentation, wherein an intermediate state or position of the drawer is shown.

One or more implementations of the present invention are described herein using detailed descriptions of embodiments thereof that are provided by way of example and are not intended to necessarily limit the scope of the invention. The described embodiments comprise different features, not all of which are required in all embodiments of the invention. Some embodiments of the invention utilize only some of the features or possible combinations of the features. Alternatively or additionally, portions of the invention described/depicted as a single unit may reside in two or more separate physical entities which act in concert to perform the described/depicted function. Alternatively or additionally, portions of the invention described/depicted as two or more separate physical entities may be integrated into a single physical entity to perform the described/depicted function. Variations of embodiments of the present invention that are described and embodiments of the present invention comprising different combinations of features noted in the described embodiments can be combined in all possible combinations including, but not limited to use of features described in the context of one embodiment in the context of any other embodiment. The scope of the invention is limited only by the following claims. In the description and claims of the present application, each of the verbs "comprise", "include" and "have" as well as any conjugates thereof, are used to indicate that the object or objects of the verb are not necessarily a complete listing of members, components, elements or parts of the subject or subjects of the verb. All publications and/or patents and/or product descriptions cited in this document are fully incorporated herein by reference to the same extent as if each had been individually incorporated herein by reference.

It should be pointed out that "comprising" does not exclude other elements or steps, and "a" or "one" does not exclude a plural number. Furthermore, it should be pointed out !that characteristics or steps which have been described with reference to one of the above embodiments can also be used in combination with other characteristics or steps of other embodiments described above. Reference characters in the claims are not to be interpreted as limitations.

Reference is made first to FIGS. 1a and 1b.

In FIGS. 1a and 1b a first embodiment of a storage compartment device 10 according to the invention are illustrated diagrammatically in cross-sectional representation.

The storage compartment device 10 is arranged in an interior panel part 1 or integrated with an interior panel part 1 which, at least in the area of the storage compartment device 10, can comprise a support panel or can comprise a support layer 101 and a decoration layer covering the same. The interior panel part 1 can particularly be an instrument panel.

The storage compartment device 10 comprises a frame or housing 20 to which a drawer 30 with a first or front end E1 and a second or rear end E2 is movably linked so that the drawer 30 is moveable in an extension direction 11 and a retraction direction 12 being opposed to the extension direction 11. In FIG. 1a a frame 20 is shown. The housing 20 of the storage compartment device 10 can be fastened to a cross member or support beam 2 for positioning the same in the interior IR of the vehicle. The support beam 2 can be part of a body part of the vehicle or can be connected to a body part of the vehicle so that the support beam 2 is fixedly arranged in the interior IR of the vehicle. Also, the housing or frame 20 can alternatively or additionally be mounted to such a body part. Further, alternatively or additionally, the support beam 2 can be supported by the interior panel part 1 when it is supported by a body part of the vehicle. The interior panel part 1 can particularly be used for installing the same as interior panel of a vehicle in the interior of a vehicle and e.g., when seen in the longitudinal direction or X-direction of the vehicle, in a front interior region of the interior of the vehicle so that the storage compartment device 10 is disposed in front of a passenger sitting on a front seat of the vehicle. In FIG. 1a a passenger is shown in form of an eye symbol with the reference numeral P.

In FIG. 1a a vehicle coordinate system CS-V with regard to the vehicle is shown to which the interior IR belongs. The vehicle coordinate system CS-V has as coordinate axes a longitudinal axis X, a lateral axis Y and a vertical axis Z which is directed opposed to the gravity direction. In the following description the axes of the vehicle coordinate system CS-V can be applied with regard to the storage compartment device 10 which implies that the storage compartment device 10 is installed in the vehicle.

For the drawer 30 a longitudinal direction DL, a width direction DW and a depth direction DD can be defined which are fixed to the drawer 30 and are oriented vertically to each other (FIG. 1a).

The storage compartment device 10 is integrated with the interior panel part 1 such that the frame or housing 20 is arranged behind the interior panel part 1. The drawer 30 is held in the frame 20 when it is moved between a retracted and an extended position with regard thereto. The drawer 30 comprises two side walls 34 extending with regard to the width direction DW in a distance from each other (in the schematic drawing of FIG. 1a only one side wall 34 is shown), a base 33, a rear wall 32 and a front wall 31, by which an inner space of the drawer 30 is delimited. With regard to the depth direction DD at an upper end 35 of the drawer 30 there is no wall provided so that the drawer 30 comprises an upper opening 30a and a user P has access to the inner space of the drawer 30. Alternatively, an upper wall (not shown) can partly cover the opening of the drawer 30.

In FIG. 1a, the drawer 30 is illustrated in the retracted position and in dashed lines in the extended position II, so that FIG. 1a shows the two extreme movement states of the drawer 30 in the frame 20 of the shown embodiment of the storage compartment device 10. The storage compartment device 10 can be integrated with the interior panel part 1 such that, in the retracted position I, the storage space of the drawer 30, which is delimited by the side walls 34, the rear wall 32, the front wall 31 and the base 33, is neither visible nor accessible to persons or occupants P sitting in the interior IR of the vehicle. The storage volume of the drawer 30 is arranged in the shown embodiment substantially completely in the interior of the housing or frame 20, so that a covering of the storage space takes place basically by the interior panel part 1 and the front wall 31 of the drawer 30 and depending of the movement state of the drawer 30 in addition by the housing or frame 20. Thereby, a substantially closed contour is produced from the visible face of the interior panel part 1, which can comprise gaps between the interior panel part 1 and the front wall 31 of the storage compartment device 10.

The frame or housing 20 can comprise an upper part 25, a bottom part 23, a rear part 27. With regard to the longitudinal direction DL of the depth direction DD of the storage compartment device 10 and at the side facing the interior IR, the upper part 25 has a front end section 25a and the bottom part 23 has a front end section 23a, the ends thereof forming an opening 28 through which the drawer 30 can be moved. The parts can be designed such that the parts 23, 25, 27 form a cage or the like defining a receiving area 29 for receiving the drawer 30 in its retracted state I. In the extended position II, parts of the side wall 34 and of the base 33 are situated outside receiving area 29 of the housing or frame 20, which are situated in the receiving area 29 of the housing 20 in the retracted position I. Therefore, on a movement of the drawer 30 in the extension direction 11, these parts are moved from the retracted position I into the extended position II through the opening 28 of the housing 20 and vice versa in the retraction direction 12. In the shown embodiment of the invention, the rear wall 32, on the other hand, remains in both positions I, II inside the housing 20, whereas the front wall 31 remains in both positions I, II outside the housing 20. In FIG. 1b an intermediate state or intermediate position III of the drawer 30 in the frame 20 is shown.

The storage compartment device 10 comprises a movement device or guiding device 40, which guides the drawer 30 along a continuously curved path of movement comprising a translational component of movement and a rotational component of movement, when the drawer 30 is moved from the retracted position I into the outmost extended position II in an extension direction 11 or vice versa in a retraction direction 12.

The guiding device 40 comprises a guide track device 50 for providing the extension movement and the retraction movement of the drawer 30 and a holding system 60 for holding the drawer 30 at predefined states with regard to the body part 2. Generally, the guide track device 50 is designed such that the movement of the drawer 40 for extending or retracting the same is adapted to the form of the interior panel part 1 in which the storage compartment device 10 is respectively installed and at the same time a predetermined attitude of stability of the drawer is achieved when the storage compartment device 10 is integrated under normal requirements in the interior panel part 1 installed in the vehicle.

In the embodiment of the storage compartment device 10 shown in FIGS. 1a to 1g, the guide track device 50 is disposed at the drawer 30 and the holding system 60 is connected to the frame 30 or the body part. According to another embodiment of the storage compartment device 10 shown in FIG. 2, the guide track device 50 is disposed at the frame 20 or the body part and the holding system 60 is disposed at the drawer 30.

With reference to FIG. 1a, each guide track device 50 is fixedly disposed at the drawer 30 and the holding device 60 is connected to the frame 30 or the body part. The guide track device 50 comprises a first contact surface 51, which is arranged on the upper side of the guide track device 50 with regard to the vertical axis Z or depth direction DD. In addition, the guide track device 50 comprises a second contact surface 52, which is directed opposed to the first contact surface 51 and is arranged on the underside of the guide track device 50. The term "upper side" means the first contact surface 51 is directed in a direction which is directed opposite to the gravity direction when the guide track device 50 is installed in the vehicle as part of the frame 20 or the body part at which it is respectively disposed.

The storage compartment device 10 comprises two guide track devices 50 which are provided on lateral sides of the drawer 30 or the storage compartment device 10. In an embodiment of the storage compartment device 10 each guide track device 50 is part of the drawer 30 or fixedly connected thereto and the at least two holding devices 69a, 69b are connected to or are part of the frame 20 or the vehicle body part as shown in FIG. 1a.

The holding system 60 can comprise at least two holding devices 69a, 69b for holding the drawer 30 in a predefined position with regard to the frame 20 during the extension or retraction movement of the drawer 30 and for allowing the extension or retraction movement. A first holding device 69a and a second holding device 69b of the two holding devices 69a, 69b or the rollers of the two different holding devices 69a, 69b have a distance 65 from each other. The storage compartment device 10 can comprise more than two holding devices 69a, 69b. In this case the at least one further holding device is positioned between the first holding device 69a and the second holding device 69b. In the embodiment of the drawer 30 shown in FIG. 1a the holding devices 69a, 69b comprise two roller pairs 67a, 67b each with two rollers 68, so that the holding system 60 according to FIG. 1a comprises a first roller pair 67a and a second roller pair 67b. The rollers of each roller pair 67a, 67b are disposed such that a first roller 68 of a first roller pair 67a is in contact here with the first contact surface 51 and a second roller 68 of the first roller pair 67a is in contact with the second contact surface 52. Also, a first roller 68 of a second roller pair 60a is in contact with the first contact surface 51 and a second roller 68 of the second roller pair 67b is in contact with the second contact surface 52. Generally, instead of rollers contact devices like gliding devices or gliding blocks which are in contact or in engagement with the respective guide track 50a and which do not rotate could be used.

The guide track is formed with curved sections in order to be able to design the drawer 30 with an optimal volume with regard to the size of the receiving area 29 which is available in the respective application of the storage compartment device 10 and with regard to providing special extension and retraction movements with minimization of the remaining slot 28a of the opening 28 in all states of the drawer 30.

The guide track device 50 can have at least two sections which are acting, when the storage compartment device 10 is installed, as a descending slope and/or ascending slope for a reference point which is fixed on the drawer 30 and e.g. a point of the first end E1 of the same with regard to a reference point in the interior IR of the vehicle when seen form the view of a passenger P or with regard to a vehicle coordinate system CS-V. The term "descending slope" means that during moving the drawer 30 from a retracted position to an extended position, or vice versa, the front end E1 of the drawer 30 or a fixed reference point thereon performs a descending movement. The term "ascending slope" means that during moving the drawer 30 from a retracted position to an extended position or vice versa the front end E1 of the drawer 30 or a fixed reference point thereon performs an ascending movement. In FIG. 1a an extension direction D1 and a retraction direction D2 is shown.

According to the embodiments illustrated in FIGS. 1a and 1b, the two roller pairs 67a, 67b are arranged in the longitudinal direction DL spaced apart from one another with a minimum distance 65. The extent of the minimum distance 67 can be a multiple of the size of the diameter of the rollers 68, but is smaller than the overall length of the guide track device 50.

In the embodiment of the storage compartment device 10 as illustrated in FIG. 1a, the guide track device 50 has a uniform direction of curvature, i.e. the guide track device 50 has no inflection point. In this regard, the degree of curvature can be between 10° and 30°, which means that the inclination of the guide track device 50 changes between by this amount between a first end 50a of the guide track device 50 and a second end 50b of the guide track device 50, wherein the first end 50a and the second end 50b lie opposed to each other. guide track device 50 In this embodiment of the storage compartment device 10 the guide track device 50 is arranged such that a maximal point of the guide track device 50 lies in a middle section 63, so that the guide track device 50 forms a descending slope on both sides of the middle position when seen in the lateral direction Y. In this regard, from the middle section 63 to the first end 50a of the guide track device 50 a first end section 61 and from the middle section 63 to the second end 50b of the guide track device 50 a second end section 62 extends. Both the first end section 61 and the second end section 61 are descending with regard to the middle section 63, i.e. are lying below the middle section 63 in the direction of gravity or opposed to the Z-direction. When the drawer 30 is in its intermediate position III, the guiding device 40 is contacting the guide track device 50 in its middle section 63. When viewed in the lateral axis Y, the first end section 61 and the second end section 62 form descending slopes with regard to the middle section 63. As the guide track of the guide track device 50 has a uniform curvature, the guiding device 40 and the drawer 30 in its intermediate state III form a bistable system, which moves the drawer 30, due to gravity, according to its position on the guide track device 50 per se into the retracted position I or the extended position II. Therefore, to move the drawer 30 from the retracted position I into the extended position II, an occupant P must respectively only move the drawer 30 in the withdrawal direction AR just beyond the middle position, in order to bring about a change of position. Generally, the form of the middle section 63 in combination with the end sections 61, 62 is such that the drawer 30 in a middle movement section of his complete movement between its retracted and the extended state takes a state, from which it can be easily moved into the extension direction 11 and the retraction direction 12 by exerting a relatively small external force on the drawer 30 in the respective direction. In this regard, the guide track 50a comprises at least a section in which the guide track 50a has a curved form so that the gravity force acting on the drawer in an intermediate state between the retracted and extended state I, II supports the movement of the drawer 30 in a further retracted and extended state. The embodiment of FIGS. 1a and 1b generally concerns a storage compartment device 10 with the guide track 50a which comprises a middle section 63 and two end sections 61, 62 extending in opposed directions from the middle section 63, wherein the two end sections 61, 62 have a curved form by which the guide track 50a increasingly descend with regard to the middle section 63.

The middle section 63 can have at least the length of the 65. Additionally or alternatively thereto, according to a further embodiment of the storage compartment device 10 according to FIGS. 1a and 1b, the two end sections 61, 62 extend over at least the length which is greater than the 65.

Figure 1C:
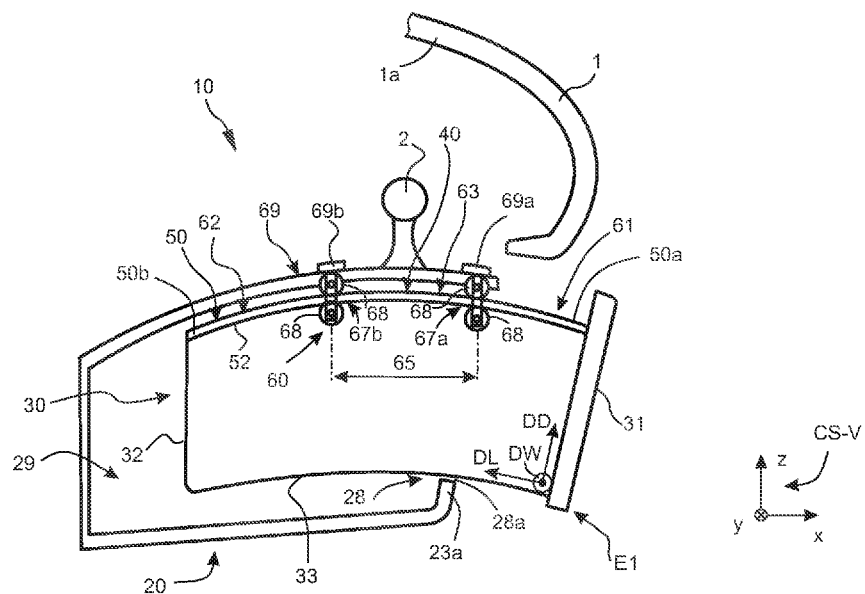
FIG. 1c shows a further embodiment of a storage compartment device according to the invention in a schematic cross-sectional view, wherein a base of the drawer is formed as a curved plate with uniform curvature.

FIG. 1c shows a further embodiment of the storage compartment device 10 in which the base 33 of the drawer 30 is formed as a curved plate wherein the curvature of the base 33 is uniform and is realized in the same direction as the direction of the curvature of the track 50a. With this form of the base 33 the front end section 23a of the bottom part 23 can be designed such that the end of the front end section 23a facing the bottom part 23 is located very close at the base 33 in all states of the drawer 30 so that the slot 28a is relatively small and a passenger P cannot look into the inner of the frame or housing 20. Consequently, the front wall 31 of the drawer 30 can be designed such that it need not protrude so far over the extension of the base 33 in the longitudinal direction DL in order to cover the slot 28a when the drawer 30 is in its retracted position. Further, with the form of the base 33 according to FIG. 1c the movement force by which the drawer 30 moves from its intermediate position III to its retracted or extended position (not shown in FIG. 1c) can be higher than in an embodiment with a base 33 in the form of FIG. 1a.

Figure 1D:
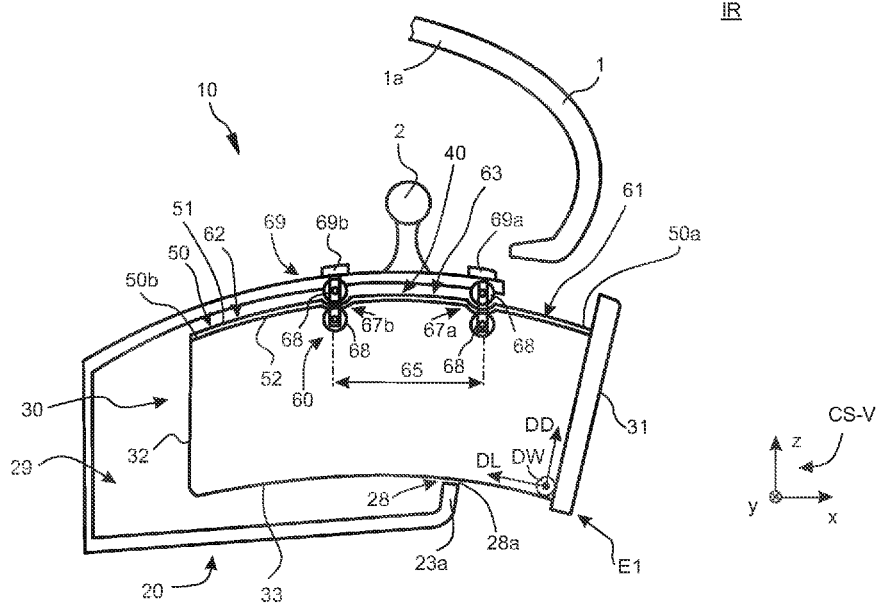
FIG. 1d shows a further embodiment of a storage compartment device according to the invention in a schematic cross-sectional view, which differs from the embodiment of the storage compartment device shown in FIG. 1c by two convexities of the track.

FIG. 1d shows a further embodiment of the storage compartment device 10, which differs from the embodiment of the storage compartment device 10 shown in FIG. 1c by two convexities 56, 57 of the track 50a. Generally, only one convexity in at least one guide track can be sufficient. When viewed in the longitudinal direction DL, the centres of the convexities 56, 57 or lowest points of the convexities 56, 57 on the first surface 51 with regard to the depth direction DD are lying in the same distance from each other than the distance 65 between the two pair of rollers 67a, 67b. The convexities 56, 57 are located such that the drawer 30 takes its intermediate state III when the upper roller 68 of each pair of rollers 60a, 60b is situated in a respective convexity 56, 57. Thereby, in the intermediate state III the drawer 30 is stabilized in its position by the respective rollers 68 co-acting of convexities 56, 57. Due to the curved form of the track 50a the drawer 30 can be moved from this intermediate state III to its retraced or extended state after an initial force is exerted on the drawer 30 in order to bring the drawer 30 out of the convexities 56, 57. Thereafter, only little force needs to be applied on the drawer 30, as the gravity force acts in the direction of the extended and retracted position, respectively. In this embodiment wherein the guide track 50a generally comprises at least one convexity for receiving a roller 68 on the first surface 51.

Figure 1E:
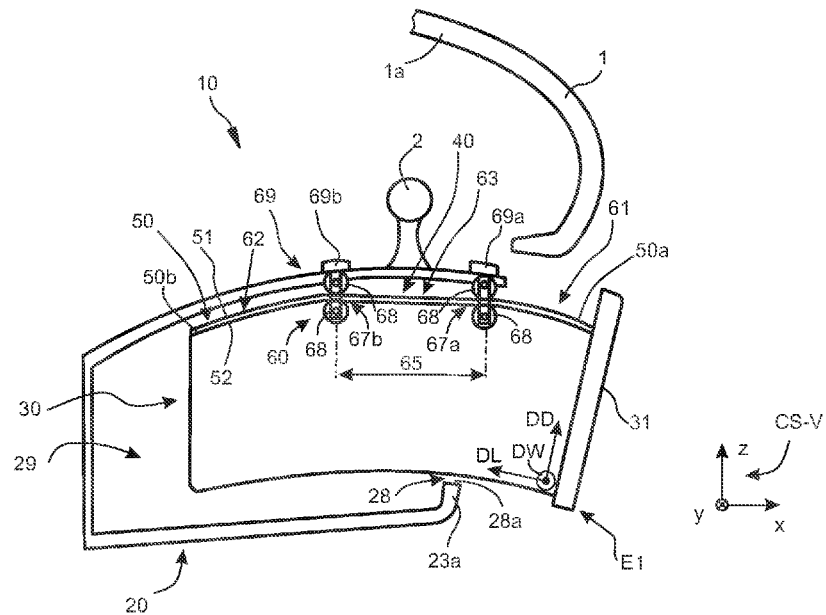
FIG. 1e shows a further embodiment of a storage compartment device according to the invention in a schematic cross-sectional view, wherein the track comprises a straight-lined middle section and, extending therefrom, two curved end sections.

FIG. 1e shows a further embodiment of the storage compartment device 10 which comprises a track 50a with a straight-lined middle section 63 and, extending therefrom, two curved end sections 61, 62. The end sections 61, 62 are curved such that they descend with regard to the gravity direction or depth direction DD when seen from the middle section 63. The length of the middle section 63 is greater than the distance 65 between the two pairs of rollers 67a, 67b. With this embodiment a defined movement section of the drawer with an indifferent state of movement is provided.

Figure 1F:
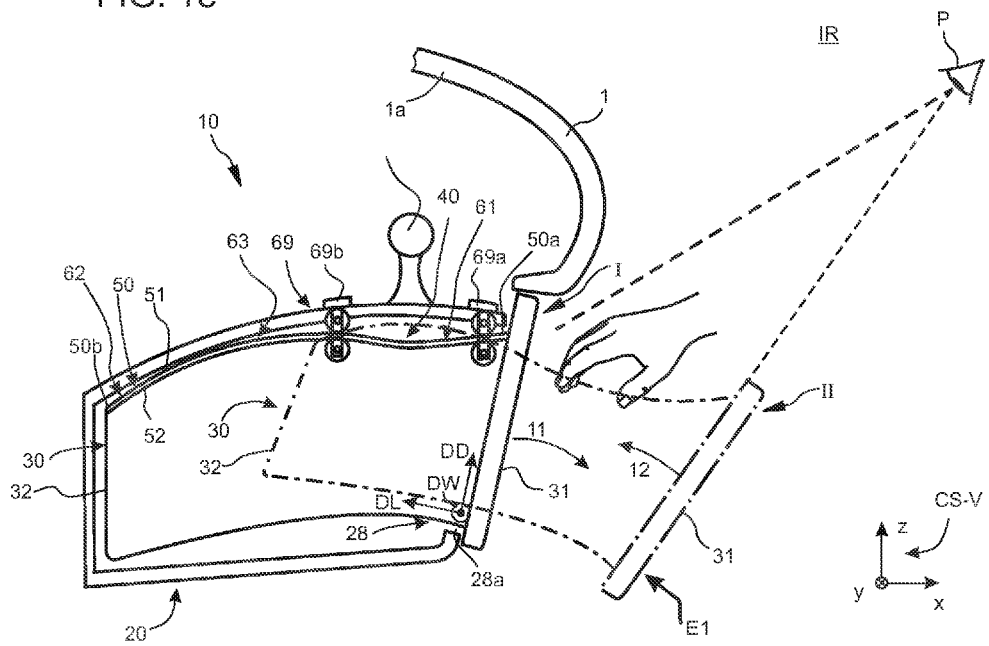
FIG. 1f shows a further embodiment of a storage compartment device according to the invention in a schematic cross-sectional view, wherein the track has an inflection point.

A further embodiment of the storage compartment device 10 is shown in FIG. 1f. In this embodiment the track 50a has an inflection point W, as a first end section 61 of the track 50a is formed with a first uniform curvature and the second end section 62 of the track 50a is formed with a second uniform curvature, wherein the first uniform curvature is oriented opposed to the second uniform curvature. In the embodiment of the storage compartment device 10 is shown in FIG. 1f the first uniform curvature of the first end section 61 is formed in a convex manner when seen from below the track 50a in the depth direction DD. In the embodiment of the storage compartment device 10 shown in FIG. 1f, the inflection point W lies in the middle section 63 and between the first and the second pair of rollers 67a, 67b. The inflection point W can also lie between the first and the second pair of rollers 67, 67b.

Figure 1G:
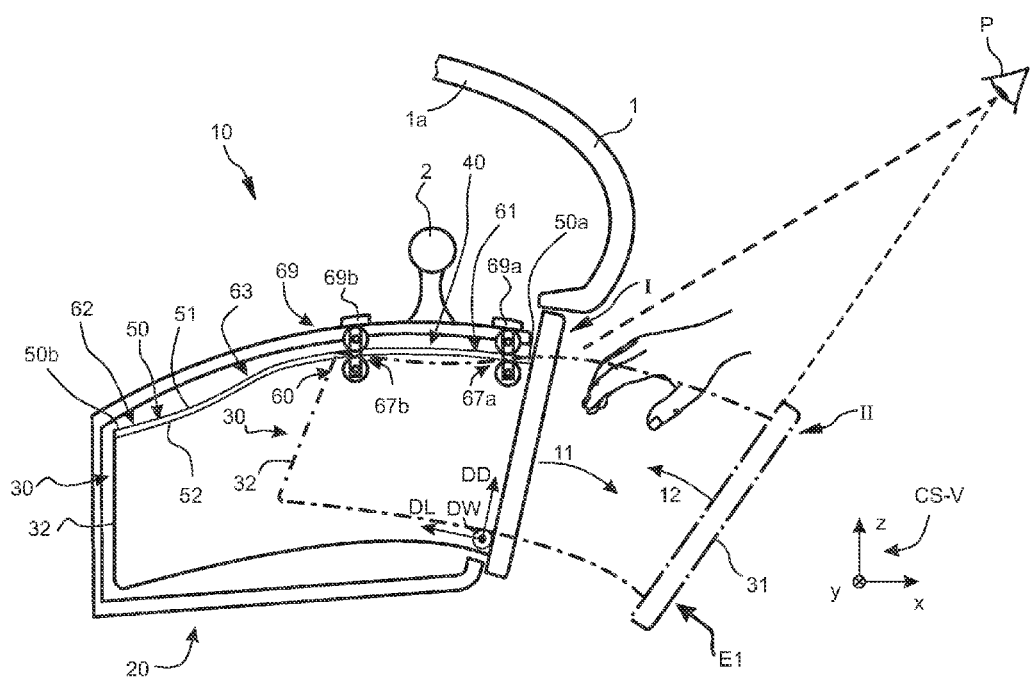
FIG. 1g shows a further embodiment of a storage compartment device according to the invention in a schematic cross-sectional view, wherein the track has an inflection point and is formed differently with regard to the track shown in FIG. 1f.

The embodiment of the storage compartment device 10 shown in FIG. 1g also comprises the track 50a with an inflection point W. The first end section 61 of the track 50*a* is formed with a first uniform curvature and is formed in a concave manner when seen from below the track 50*a* in the depth direction DD. The second end section 62 of the track 50*a* is formed with a second uniform curvature, wherein the first uniform curvature is oriented opposed to the second uniform curvature.

With the embodiments of the storage compartment device 10 described herein, and in particular with the embodiments of FIGS. 1*f* and 1*g*, a movement in the extension direction 11 and the retraction direction 12 of the drawer 30 is provided to a passenger P in which the attitude of the drawer 30 changes during its movement in an non-uniform manner so that a special adaption of the movement of the drawer 30 to the design of the inner lining part 2 and the interior of the vehicle under ergonomic requirements is possible. In this regard, descending slopes of the respective track 50*a* assists the moving of the drawer from the extended position II into the retracted position I.

In all embodiments the base plate 33 can be formed as e.g. shown in FIG. 1*a*: the drawer 30 comprises a base plate 33 which is curved between the first end E1 and the second end E2 of the drawer 30 with a uniform curvature therebetween, wherein the curvature is formed such that, with regard to a longitudinal direction DL of the storage compartment device 10, a middle section of the base plate 33 lies above or higher with regard to the direction of the gravity force than the end section of the base plate 33.

Figure 2:
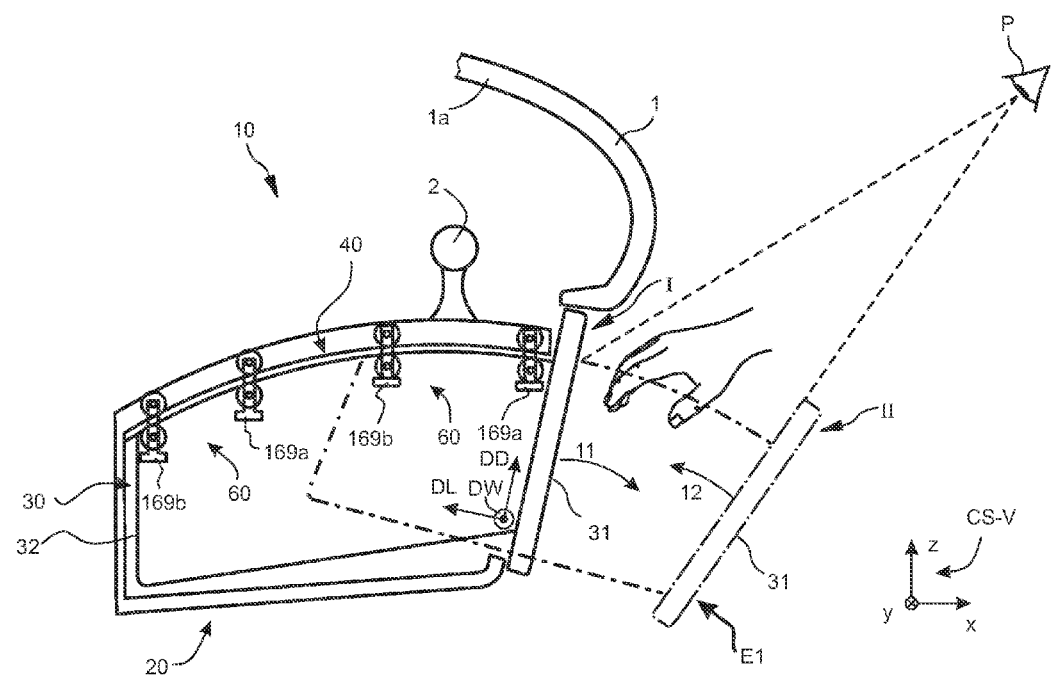
FIG. 2 depicts a second embodiment of a storage compartment device according to the invention, in which a guide track device is disposed at a frame or a body part and holding device for rollers is disposed at the drawer.

A further embodiment of the storage compartment device 10 is shown in FIG. 2. In opposite to the embodiments shown in FIGS. 1*a* to 1*g*, the track 50*a* of the embodiment of FIG. 2 is fixed to the frame 20 and the holding devices 169*a*, 169*b* are fixed to the drawer 30. Each holding device 169*a*, 169*b* a pair of rollers 67*a*, 67*b*, respectively is rotatably mounted.

Generally, the rollers of a storage compartment device 10 and at least the rollers which lie on one side of the guide track 50*a* can be synchronized by a synchronization device. Thereby a jamming of the drawer 30 in the frame or housing 20 is avoided.

In the embodiments of the storage compartment device 10 according to FIGS. 1*f* and 1*g* generally the guide track 50*a* comprises two end sections 61, 62 which have a curvature which is opposed to each other so that the guide track 50*a* has an inflection point or a turning point W, which divides the guide track 50*a* into the first section 61 with a direction of curvature, which is per definition positive, and a second section 62 with a respective negative direction of curvature. The position of the inflection point or a turning point W can be understood as middle section 63.

In the embodiments of the storage compartment device 10 having a guide track device 50 with a track 50*a* with a inflection point W the angling acting on the drawer 30 on reaching the extended position II is less than the positive degree of curvature alone. In storage compartment device 10, the radii of the first end section 61 and of the second end section 62 can be different from each other. In addition, the length of the first end section 61 can be greater than the length of the second end section 62.

Referring to the embodiment of the storage compartment device 10 shown in FIG. 1*g*, the movement of the drawer 30 is described: To move the drawer 30 from the retracted position I into the extended position II, an occupant P must move the drawer 30 in the withdrawal direction 11 along the first end section 61, so that in accordance with the curvature course of the guide track device 50 the drawer 30 is deviated by a positive degree of curvature of the first section 61. In this first phase, the drawer 30 undergoes a maximum deviation of e.g. 20° to 30°. In addition, an incline of the guide track device 50 must be overcome for this.

When in a second phase the drawer 30 is then moved by the occupant P in the withdrawal direction 11 along the second end section 62 the drawer 30 is deviated according to the degree of curvature 68 of the second end section 62. Owing to the now negative degree of curvature in the second end section 62, the drawer 30 is deviated or rotated in the opposite direction, so that the deviation of the drawer 30 is reduced again. At the same time, this second end section 62 is formed such that due to the gravity the drawer 30 continues to move further into the extended position II. As a result, the drawer 30 is thus particularly easily accessible for an occupant P.

Figure 3:
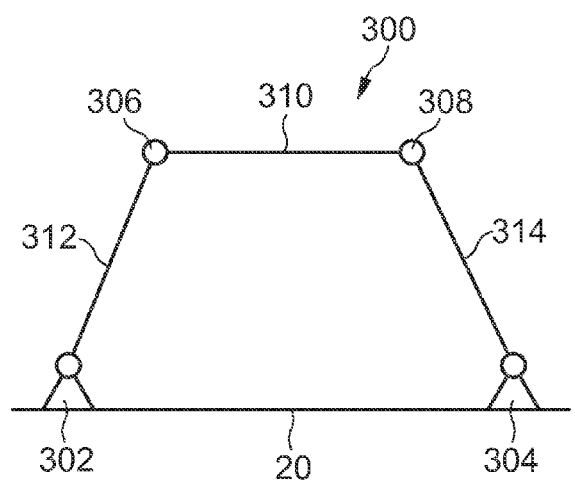
FIG. 3 shows an example embodiment for a linkage for a further example embodiment of a storage compartment device according to the invention.

Reference is now made to FIG. 3 which shows a diagrammatic illustration of a linkage 300, which has a further example embodiment of the invention as a component of the guiding device 40 for guiding the drawer 30.

In this example embodiment, the linkage 300 is constructed as a four-bar chain. The linkage 300 has four joints 302, 304, 306, 308, two transmission members 312, 314 and one coupler 310.

The first joint 302 and the second joint 304 are securely connected with the housing 20. The first transmission member 312 is connected with the first joint 302, whilst the second transmission member 314 is connected with the second joint 304. The first transmission member 312 is connected with the third joint 306, whilst the second transmission member 314 is connected with the fourth joint 308. The third joint 306 and the fourth joint 308 are connected with one another via a coupler 310. The drawer 30 is connected with the coupler 310. Such a linkage 300 has only one degree of freedom.

The linkage 300 can be constructed as a double rocker, in which the transmission members 312, 314 can not carry out a complete rotation. With a double rocker, a path of movement can be provided which has no turning point.

Alternatively, the linkage 300 can be constructed as a crank-rocker mechanism, in which at least one of the transmission members 312, 314 can carry out a complete rotation. With a crank-rocker mechanism, a path of movement can be provided which has a turning point.

In the embodiment shown in FIGS. 1*a* to 2, the storage compartment device 10 can be comprised such that the drawer 30 can be actuated manually. In this regard a biasing device can be provided which biases the drawer 30 in its extended or retracted or an intermediate position. In this embodiment, a locking and release device can be provided for fixing a desired position or state of the drawer 30 and for being able to release a locked position which is locked by the locking and release device and thereby change the actual position or state of the drawer 30. Alternatively or additionally the storage compartment device 10 can be designed such that it can be actuated by a motor, e.g. an electrical motor. This motor can be directly coupled to that drawer 30. In this case, the motor can be a linear motor.

In FIGS. 4 to 7, a further embodiment of a storage compartment device 10 according to the invention is shown which has a cover which is rotatably connected to a base part of the drawer 30 which comprises the base 33, the rear wall 32 and the side walls 34. Additionally, this embodiment of the storage compartment device 10 is designed according to FIGS. 1*a* to 2 and generally comprises at least a section in which the guide track 50*a* has a curved form so that the gravity force acting on the drawer in an intermediate state between the retracted and extended state I, II supports the movement of the drawer 30 in a further refracted state and/or supports the movement of the drawer 30 in a further extended state.

In this embodiment, the drawer cover 431 is articulatedly connected with the drawer 30 via a bearing device 450 and covers the drawer 30 with respect to a front access opening 453 of the housing 20. Thereby, a substantially closed contour is produced from the visible side of the interior panel part 1, which contour shows the storage compartment device 10 exclusively via gaps between the interior panel part 1 and the drawer cover 50.

In addition the guiding device 40 is provided, which serves for bearing the drawer 30 in the housing 20. The holding system 60 comprises at least two holding devices 69a, 69b for holding the drawer 30 in a predefined position with regard to the frame 20 during the extension or retraction movement of the drawer 30 and for allowing the extension or retraction movement. A first holding device 69a and a second holding device 69b of the two holding devices 69a, 69b or the rollers of the two different holding devices 69a, 69b have a distance 65 from each other. and each of the holding devices 69a, 69b comprises a first roller pair 60a and a second roller pair 60b. The rollers of each roller pair 60a, 60b are disposed such that a first roller 68 of a first roller pair 60a is in contact here with the first contact surface 51 and a second roller 68 of the first roller pair 60a is in contact with the second contact surface 52. Instead of rollers contact devices like gliding devices or gliding blocks which are in contact or in engagement with the respective guide track 50a and which do not rotate could be used. A upper roller 67 of the rear holding device 69b is formed as toothed wheel 468. The guiding device 40 has, moreover, a movement function in addition to the simple bearing function, so that the drawer 30 can be moved between the retracted position and an extended position via the toothed wheel 468, which meshes with a toothed rack 441 fastened to the drawer 30. The toothed rack section 441 is part of the guide track and forms a section of the first surface of the same. Alternatively or additionally, the toothed rack 441 can also be part of the guide track 50a and forms a section of the first surface 51 of the same. The toothed wheel 468 is rotatably connected to the frame or housing 20 by a holding device 69. In an alternative embodiment of the storage compartment device 10, vice versa, the guide track 50a with the toothed rack 441, particularly as part of the guide track 50a, connected to the frame or housing 20 and or to the vehicle body by a mounting device and the at least one toothed wheel 468 can be rotatably mounted to the drawer 30. The toothed wheel 468 can particularly be one of the rollers of a pair of rollers 69a, 69b. The toothed wheel 468 can be connected to an actuator for rotating the toothed wheel 468 in order to change the position and state of the drawer.

Figure 4:
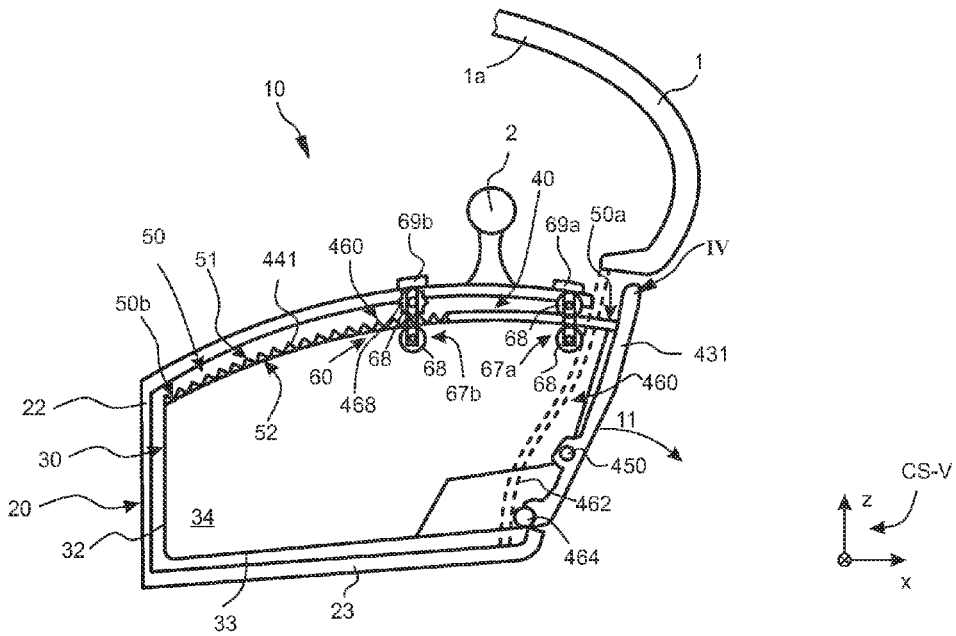
FIG. 4 shows a further embodiment of a storage compartment device according to the invention with the drawer in retracted position.
Figure 5:
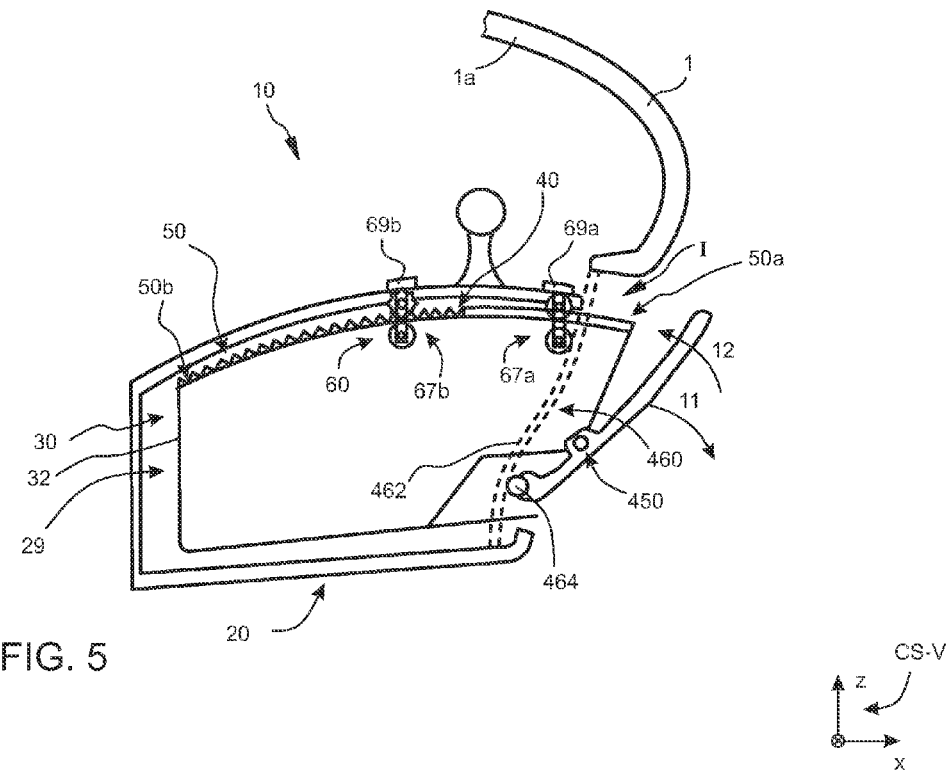
FIG. 5 depicts the embodiment of FIG. 4 during the movement of the drawer into the extended position.
Figure 6:
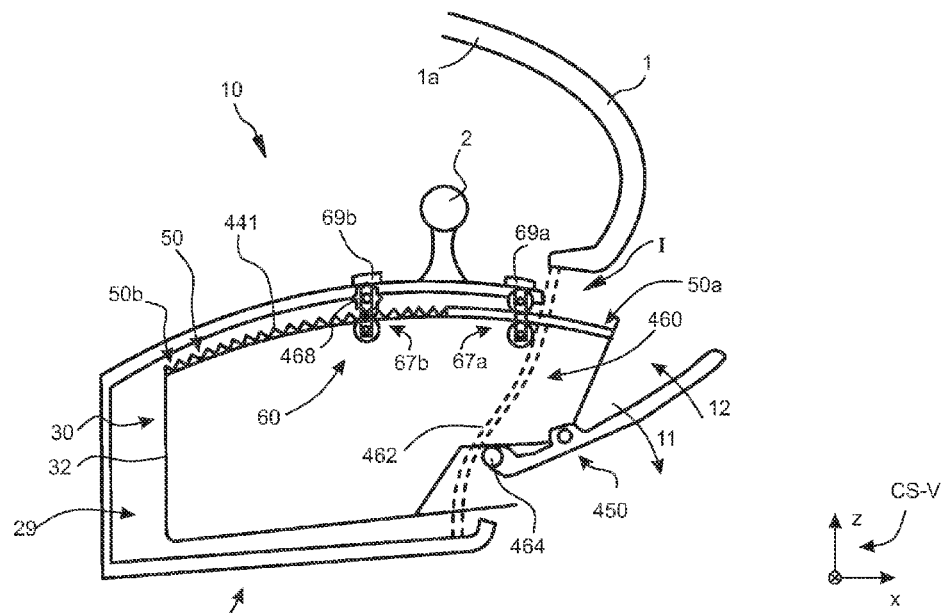
FIG. 6 depicts the embodiment of FIGS. 4 and 5, moved further in the direction of the extended position.
Figure 7:
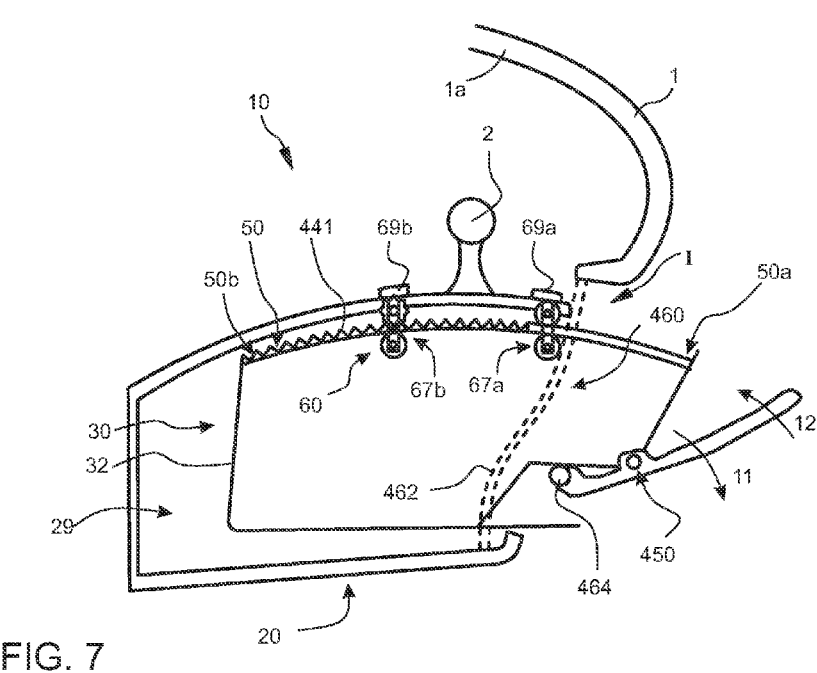
FIG. 7 depicts the embodiment of FIGS. 4 to 6 with the drawer in extended position.

When it is now desired to open the drawer 30 of a storage compartment device 10 according to FIGS. 4 to 7, the drawer 30 is shifted by means of the guiding device 40 from the retracted position, as illustrated in FIG. 4, in the direction of the extended position, as illustrated in FIG. 7. During this shifting process, a coupling takes place of the movement, i.e. the translation, of the drawer 30 between the refracted position and the extended position and the movement of the drawer cover 431. The drawer cover 431 is coupled via the articulated connection of the bearing device 450 with the drawer 30. Moreover, a guide device 460 is provided, which has a guide track device 462 and a guide device or guide means 464. The guide track device 462 is arranged so as to be stationary with respect to the housing 30, whilst the guide device 460, in the embodiment of the present Figures in the form of a roller, is connected with the drawer cover 431. The roller can therefore move in a rotating manner on the guide track device 462, i.e. can be guided along the latter.

When the drawer is pushed out from the housing 30 through its access opening 28 at the start of the movement, a transition state occurs, as illustrated for example in FIGS. 5 and 6. As can be seen, the drawer 30 moves out from the housing 20 through its access opening 453. During this movement, the guide means 464, i.e. the roller of the guide device 460, also moves along the guide track device 462. Thereby, the support situation of the drawer cover 431 is altered, so that the latter is pivoted or respectively rotated about the bearing device 450. This takes place in that the centre of gravity of the drawer cover 431 in the embodiment of the above-mentioned Figures lies to the right of the bearing device 450, and therefore works towards an opening of the drawer cover 431. This opening force works against the guide device 460 in a controlled manner, so that the opening force can be controlled as a weight force via the movement of the guide means 64 along the guide track device 50. Over the course of the movement of the drawer 30 in a translatory manner, the guide means 464 will also slide along the guide track device 50 and thereby alter the support of the drawer cover 431. As can be seen in the step between FIG. 7 and FIG. 8, by the progressing opening of the drawer 30 into the extended position, a further pivoting movement of the drawer cover 431 in the direction of the exposing position takes place until the guide device 464 comes into contact with a contact surface or locating surface of the drawer 30.

In FIG. 6 a further progress in the extending of the drawer 30 is illustrated. As can be seen here, the guide device 464 has already left the guide track device 50 and is in contact with a contact surface or locating surface of the drawer 30. The drawer cover 431 is therefore situated in the fully exposed position, i.e. in the so-called exposing position. A further extending into the final extended position of the drawer 30, as illustrated in FIG. 7, therefore no longer results in a further moving of the drawer cover 4431. Depending on the explicit embodiment, however, such a leaving of the guide track device earlier or later or not at all is envisaged. The coupling between the movement of the drawer cover 431 and the movement of the drawer 431 can therefore take place basically over a portion, but also over the entire translatory movement range of the drawer 30.

Figure 8:
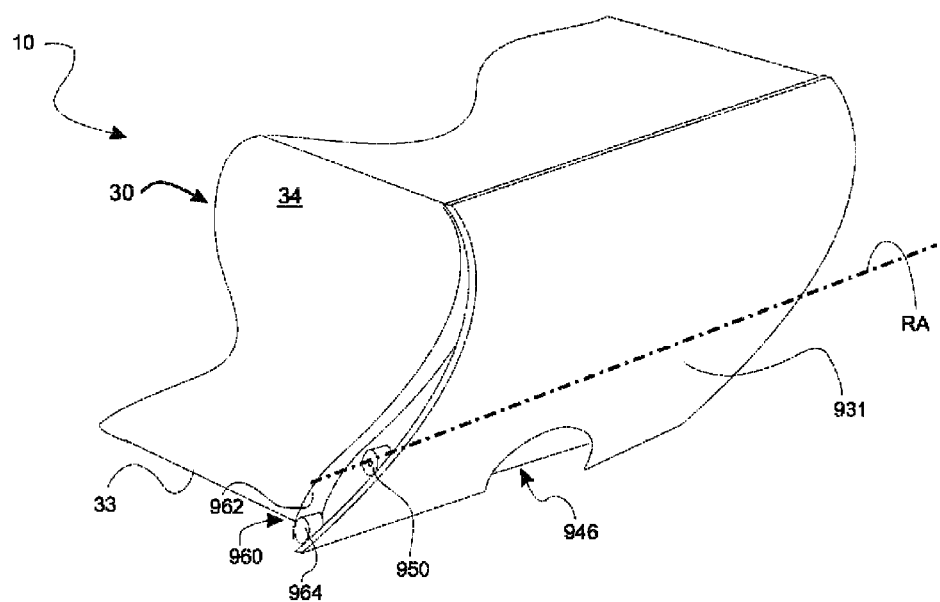
FIG. 8 shows a further example embodiment of a storage compartment device according to the invention.

In FIG. 8 a further embodiment of a storage compartment device 10 according to the invention is illustrated in isometric representation. It can be readily seen here that the drawer cover 931 already concerns a curved cover which can follow the course of an interior panel part 1 (not illustrated in FIG. 8). The guide device 960 is conFigured here in several parts and has, in particular, two guide track devices 962 and two guide means 64, which are arranged on both sides of the drawer cover 931, wherein only one of the sides, namely the front side, can be seen in FIG. 8. The bearing device 962 is also constructed at two sites, so that two bearing positions with two bearing devices 950 define a pivot axis RA. A mobility of the drawer cover 931 is possible about this pivot axis RA. This movement, i.e. the pivoting movement, is enabled by the correlation between guide means and guide track device 962.

In the embodiment of FIG. 8 a further component is a grip element 446 on the drawer 30. This is mounted in a recess of the drawer cover 931 such that the occupant of a vehicle can grip the grip element 946, for example a recessed grip, without impairing the pivoting movement of the drawer cover 931 during the extending of the drawer 30. For such an embodiment therefore a particularly simple guiding device 940 is conceivable, which is provided substantially exclusively for the bearing of the drawer 30.

Figure 9:
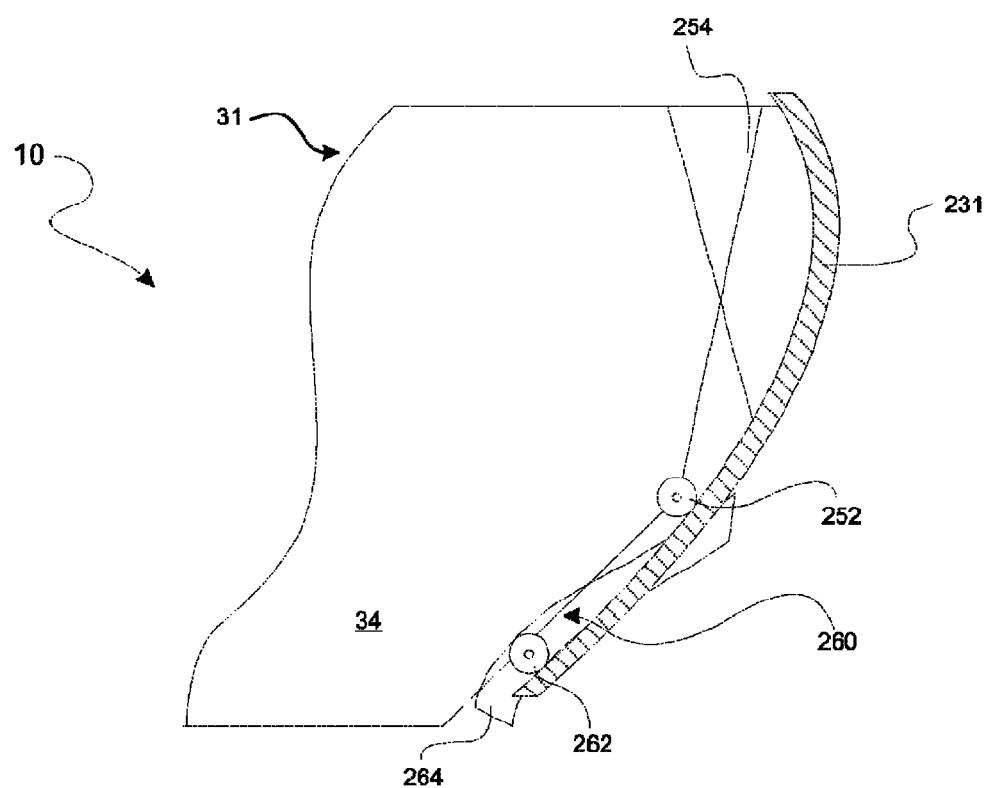
FIG. 9 shows a further embodiment of a storage compartment device according to the invention, with the drawer in retracted position.
Figure 10:
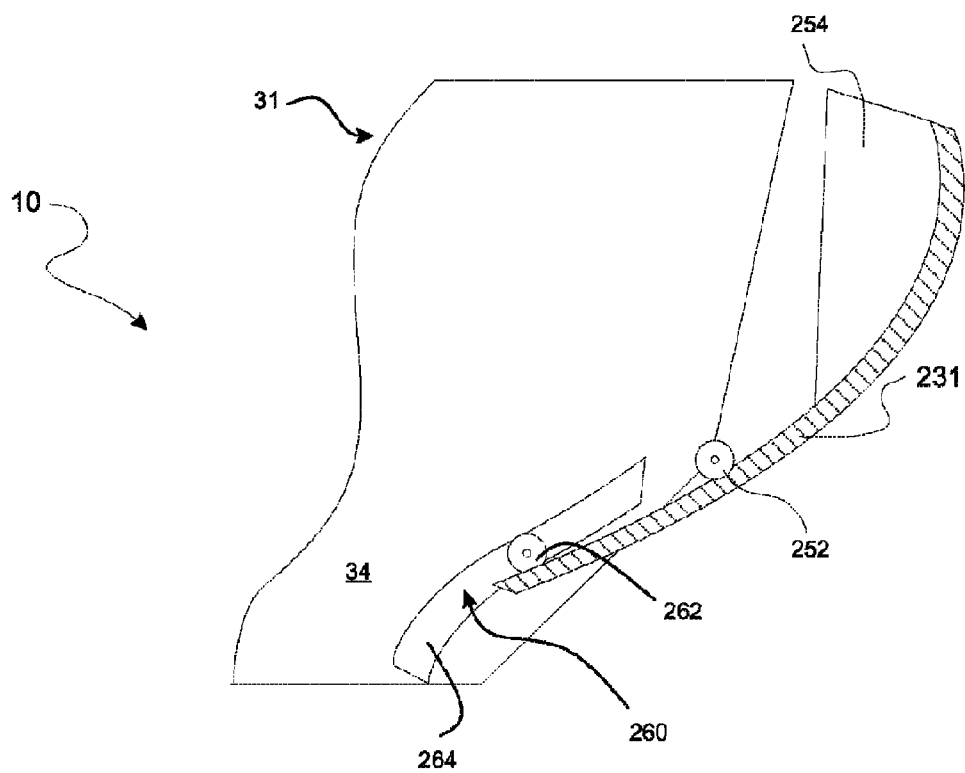
FIG. 10 depicts the embodiment of FIG. 9 during the extending of the drawer.
Figure 11:
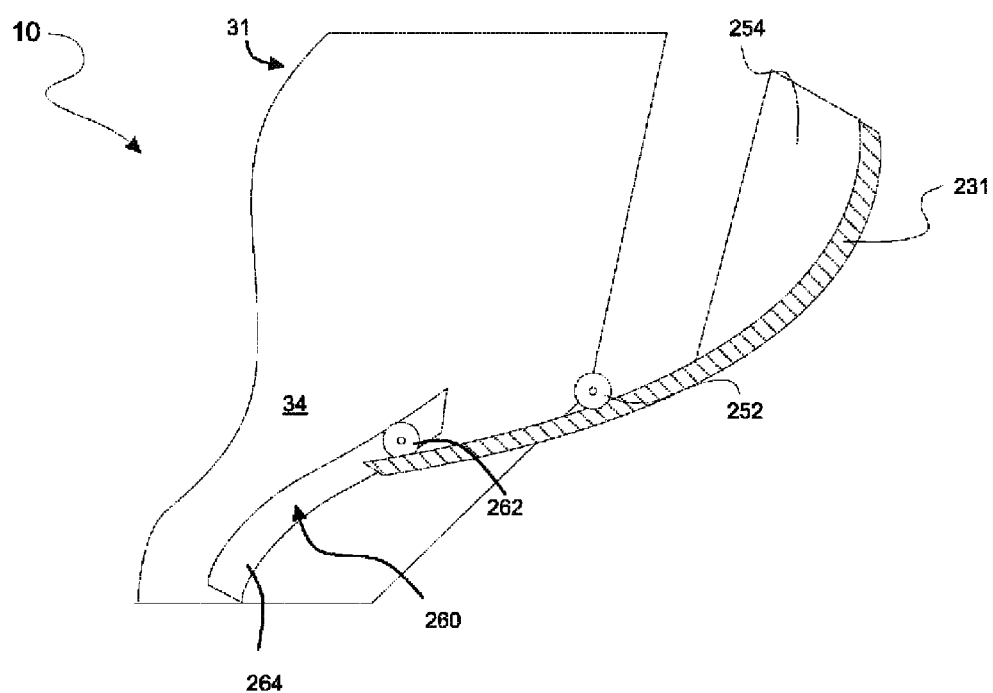
FIG. 11 depicts the embodiments of FIGS. 9 and 10 with the drawer in extended position.

FIGS. 9 to 11 show a further embodiment of the present invention. In the diagrammatically illustrated embodiment of these Figures, a particularly short guide device 260 is present. The guide device 260 has again a guide track device 264 which, however, is a two-sided guide track device, in which the guide means 50 can move exclusively along the guide track device 264. Therefore, a positive guidance of the guide means 50 takes place and hence of the drawer cover 231. With such a positive guidance, it is no longer necessary that a weight force of the drawer cover 231 acts in one direction, i.e. for example in the direction of the exposing position of the drawer cover 231. Rather, the positive guidance can guide the drawer cover 231 both into the exposing position and also into the covering position.

In the embodiment of these Figures, moreover the drawer cover 231 is equipped with side wall elements 34, which in the covering position, as it is illustrated in FIG. 10, at least partially overlap with the side walls 34 of the drawer 30. If now, as illustrated in the following FIGS. 10 and 11, the drawer 30 is extended, then a moving of the drawer cover 231 takes place via the guide device 460 into the exposing position, as is illustrated in FIG. 11. During this pivoting movement about the bearing device 250, the illustrated side wall element 34 leaves the overlapping with the side wall 34 of the drawer 30 and covers at least a portion of the resulting gap between the drawer cover 231 and the drawer 30. Of course, it is also possible that the side wall element 254 is conFigured to be larger, so that almost a complete covering of the resulting gap between the drawer cover 231 and the drawer 30 is enabled.

The invention claimed is:

1. A storage compartment device for the interior of a vehicle, the storage compartment device comprising a frame with at least one access opening, a drawer, and a guiding device by which the drawer is connected to the frame such that the drawer is movable between a retracted position and an extended position through the access opening,
    wherein the guiding device comprises at least one guide track and contact device, one of the at least one guide track and contact device is mounted on the frame and the other of the at least one guide track and contact device is mounted to the drawer,
    wherein the at least one guide track comprises a middle section and two end sections extending in opposed directions from the middle section, one of the two end sections extending toward a front end of the drawer and having a curved form that descends with regard to the middle section so that the gravity force acting on the drawer in an intermediate state between the retracted and extended state supports the movement of the drawer in a further retracted state and supports the movement of the drawer in a further extended state.

2. The storage compartment device according to claim 1, wherein both of the two end sections have curved forms that descend with regard to the middle section.

3. The storage compartment device according to claim 1, wherein the at least one guide track comprises two end sections which have opposing directions of curvature so that the at least one guide track has an inflection point.

4. The storage compartment device according to claim 3, wherein each of the contact devices comprises a first roller in contact with a first contact surface of the at least one guide track and a second roller in contact with a second contact surface of the at least one guide track lying opposed to the first contact surface.

5. The storage compartment device according to claim 4, wherein the at least one guide track comprises two guide tracks positioned on opposed sides of the drawer and wherein the rollers are synchronized by a synchronization device.

6. The storage compartment device according to claim 4, wherein the at least one guide track comprises at least one convexity for receiving a roller on the first surface.

7. The storage compartment device according to claim 1, wherein the drawer comprises a base plate which is curved between a front end and a rear end of the drawer with a uniform curvature therebetween, wherein the curvature is formed such that a middle section of the base plate located between the front and rear ends of the drawer lies above an end section of the base plate.

8. The storage compartment device according to claim 1, wherein the drawer has a front wall, which is fixedly connected with the drawer.

9. The storage compartment device according to claim 1, wherein when installed in a vehicle, the drawer is moved by the effect of gravity into the retracted position and/or the extended position.

10. The storage compartment device according to claim 1, further comprising:
    a drawer cover which is pivotably mounted by means of a bearing device on the drawer such that in the retracted position of the drawer it is situated in a covering position, in which it at least partially covers the latter, and in the extended position of the drawer is situated in an exposing position, in which it at least partially exposes the latter, and
    a guide device, coupled with the guiding device, for the movement of the drawer cover between the covering position and the exposing position.

11. A storage compartment device for the interior of a vehicle, the storage compartment device comprising a frame with at least one access opening, a drawer, and a guiding device by which the drawer is connected to the frame such that the drawer is movable between a retracted position and an extended position through the access opening,
    wherein the guiding device comprises at least one guide track and contact device, one of the at least one guide track and contact device is mounted on the frame and the other of the at least one guide track and contact device is mounted to the drawer,
    wherein the at least one guide track comprises at least a section that has a curved form so that the gravity force acting on the drawer in an intermediate state between the retracted and extended state supports the movement of the drawer in a further retracted state and/or supports the movement of the drawer in a further extended state, and
    wherein the drawer comprises a base plate which is curved between a front end and a rear end of the drawer with a uniform curvature therebetween, wherein the curvature is formed such that a middle section of the base plate located between the front and rear ends of the drawer lies above an end section of the base plate.

12. The storage compartment device according to claim 11, wherein the at least one guide track comprises a middle section and two end sections extending in opposed directions from the middle section, wherein the two end sections have a curved form by which the two end sections descend with regard to the middle section.

13. The storage compartment device according to claim 11, wherein the at least one guide track comprises two end sections which have opposing directions of curvature, so that the at least one guide track has an inflection point.

14. The storage compartment device according to claim 13, wherein each of the contact devices comprises a first roller in contact with a first contact surface of the at least one guide track and a second roller in contact with a second contact surface of the at least one guide track lying opposed to the first contact surface.

15. The storage compartment device according to claim 14, wherein the at least one guide track comprises two guide tracks positioned on opposed sides of the drawer and wherein the rollers are synchronized by a synchronization device.

16. The storage compartment device according to claim 14, wherein the at least one guide track comprises at least one convexity for receiving a roller on the first surface.

17. The storage compartment device according to claim 11, wherein the drawer has a front wall, which is fixedly connected with the drawer.

18. The storage compartment device according to claim 11, wherein when installed in a vehicle, the drawer is moved by the effect of gravity into the retracted position and/or the extended position.

19. The storage compartment device according to claim 11, further comprising:
- a drawer cover which is pivotably mounted by means of a bearing device on the drawer such that in the retracted position of the drawer it is situated in a covering position, in which it at least partially covers the latter, and in the extended position of the drawer is situated in an exposing position, in which it at least partially exposes the latter, and
- a guide device, coupled with the guiding device, for the movement of the drawer cover between the covering position and the exposing position.

* * * * *